Patented Feb. 27, 1940

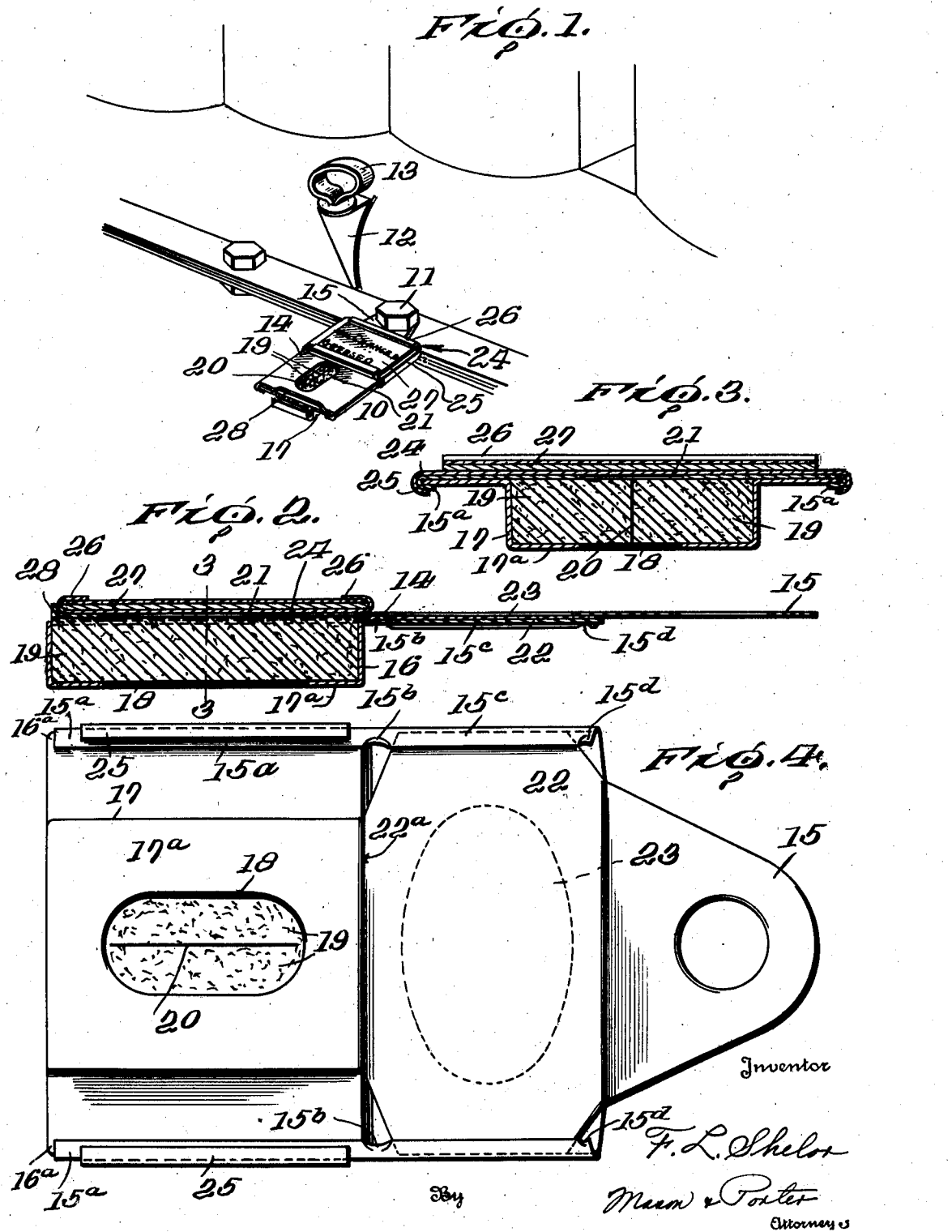

2,191,817

UNITED STATES PATENT OFFICE 2,191,817

GAUGE ROD WIPER

Frederick L. Shelor, Sandston, Va., assignor to Davis Manufacturing Company, Richmond, Va.

Application March 23, 1937, Serial No. 132,601

7 Claims. (Cl. 15—210)

The present invention relates to new and useful improvements in devices for wiping oil measuring rods which are commonly used for determining the amount of oil in the crank case of an internal combustion engine, and more particularly to improvements in a gauge rod wiper which may be easily attached to the engine in a readily accessible position.

An object of the present invention is to provide an oil rod wiper wherein a pair of absorbent pads are maintained in abutting relationship and substantially confined between supporting surfaces which are so constructed as to leave portions of the pads in the region of the abutting edges unsupported, thus permitting yielding of the unsupported portions of the pads when the gauge rod is passed therebetween for cleaning.

A further object of the invention is to provide a gauge rod wiper of the above type wherein the supporting surfaces are movable relative to one another to permit the pads to be replaced.

A further object of the invention is to provide a gauge rod wiper of the above type wherein closure means are provided for covering and protecting the exposed portions of the pads.

A still further object of the invention is to provide a gauge rod wiper wherein an absorbent pad is substantially confined between supporting members which are provided with openings to permit the passage therethrough of a gauge rod and which are movable relative to one another to permit the pad to be replaced.

A still further object of the invention is to provide a gauge rod wiper of the above type wherein limiting or stop means are provided for properly positioning the closure means and the supporting members relative to one another.

The above and other objects of the invention will be obvious and will be hereinafter more fully disclosed.

In the drawing:

Fig. 1 is a perspective view showing a portion of an internal combustion engine and the improved wiper attached thereto.

Fig. 2 is an enlarged longitudinal sectional view through the improved wiper.

Fig. 3 is a sectional view taken along the line 3—3 of Fig. 2.

Fig. 4 is a bottom plan view of Fig. 2.

The invention contemplates generally the provision of a gauge rod wiper for internal combustion engines. The wiper includes a pair of connected and relatively movable members for supporting absorbent pads therebetween. One of the supporting members is in the form of an open housing which holds the pads with their edges in abutting relationship and is closed by the other supporting member when moved to proper position. The supporting members thus confine the absorbent pads and are provided with openings which, when aligned, leave portions of the pads in the region of their abutting edges unsupported so that they may yield when the gauge rod is passed therebetween for cleaning. A closure member is slidably mounted on one of the supporting members and is adapted to close the opening therethrough in order to protect the exposed portions of the pads. This closure member serves as a convenient means for carrying data concerning the greasing of the car and the changing of the engine oil. Stop means are provided for limiting the movement of the supporting members relative to one another and for limiting the movement of the closure member relative to the supporting member on which it is mounted so that the openings through the supporting members may be properly aligned and so that the closure member may be properly positioned for protecting the pads.

Referring more in detail to the accompanying drawing, the wiper 10 may be secured to the engine by one of the bolts 11, as indicated in Fig. 1. The wiper is preferably secured to the engine at a point near the oil opening 12 in which the gauge rod 13 is disposed.

The details of the wiper 10 are shown in Figs. 2, 3 and 4. The wiper includes a flat metal supporting member 14 which is provided with an apertured extension 15 through which the bolt 11 extends for securing the device to the engine. The longitudinal edges of the supporting member 14 are curled over to provide opposed flanges 15a which form guide or trackways for a cooperating supporting member 16. The longitudinal edges 16a of the supporting member 16 are adapted to fit within the trackways. As illustrated in Figs. 2 and 3, the supporting member 16 is shaped to provide a depending housing 17 which is open at the top thereof. The bottom wall 17a of the housing 17 is provided with a relatively large opening 18. A pair of absorbent pads 19 are disposed within the housing 17 with their abutting edges 20 extending across the opening 18.

The edges 16a of the supporting member 16 may be fitted within the flanges 15a on the supporting member 14 so that the housing 17 can be shifted into the position shown in Figs. 2 and 3. The supporting member 14 is provided with an opening 21 which is in alignment with the opening 18 in the housing 17 when the supporting members are in this position. The flanges 15a are depressed at 15b and 15d to hold the edges of a backing plate 22 therebetween against removal. The portions 15c of the flanges 15a are pressed tightly upon the edges of the backing plate. A card for identification, advertising or the like purposes may be inserted between the backing plate 22 and the forward portion of the supporting member 14 which is provided with an opening 23 through which the card may be viewed. The edge 22a of the backing plate 22 is, as illustrated in Fig. 4, extended so that it serves as a stop against which the supporting member 16 abuts.

A closure member 24 is provided with opposed flanges 25 which overlie the flanges 15a on the supporting member 14. Thus, the closure member may be moved between the positions shown in Figs. 1 and 2 to uncover or cover the opening 21 in the supporting member 14. The closure member is also provided with transverse flanges 26 which serve as a means for removably holding a card 27 for indicating the mileage at which the car was greased and at which the oil was changed. A transparent member may be placed above the card 27 and maintained in position by the flanges 26.

The supporting member 14 is provided with an upturned end flange 28 which serves as a stop to limit the movement of the closure member 24 toward a closed position. As indicated in Fig. 1, the bolt 11 serves as a stop to limit the movement of the closure member to an open position.

When the wiper 10 is secured to the engine, as shown in Fig. 1, the closure member 24 may be moved to uncover the opening 21 in the supporting member 14. When in this position, the oil measuring rod 13 may be passed between the abutting edges 20 of the absorbent pads for cleaning. It will be noted that the absorbent pads 19 are confined between the supporting members 14 and 16 but that portions of the pads extending across the aligned openings 18 and 21 in the supporting members are unsupported so that the pads may yield or flex when the gauge rod is passed therebetween. When the oil has been measured, the closure member 24 may be moved into the position shown in Fig. 2 wherein the flange 26 thereof abuts against the stop 28 on the supporting member 14. The supporting member 16 may be removed from the supporting member 14 so that the pads 19 may be reversed to present clean abutting edges across the opening and so that the pads may be replaced when necessary.

From the foregoing description, it will be seen that a portion 17 of the supporting member 16 is in the form of a housing which carries the absorbent pads 19 and which maintains the edges thereof in abutting relationship across the opening 18. When the housing member, with the pads therein, is positioned on the supporting member 14 so that it abuts against the extended edge 22a of the backing plate 22, the pads are tightly confined between the two supporting members 14 and 16 except for the portions thereof which extend across the openings 18 and 21 in the supporting members 16, 14 respectively. The portions of the pads extending across the openings in the supporting members are unsupported so that they may flex or yield when the gauge rod is passed therebetween for cleaning. The pads may be readily reversed to present clean edges or they may be easily replaced by removal of the housing member 16. When the wiper is secured on the engine, the closure member, when disposed over the opening 21 in the supporting member 14, protects the exposed portions of the pads 19 and thus prevents access thereto of dirt or the like.

It is to be clearly understood that minor changes in the details of construction and arrangement of parts may be made without departing from the scope of the invention as set forth in the appended claims.

I claim:

1. A gauge rod wiper comprising a pair of supporting members connected to one another for relative sliding movement, each of said supporting members having an opening adapted to be aligned with the opening in the other of said supporting members, and a pair of absorbent pads disposed between and maintained in position by said supporting members when the openings are aligned, said absorbent pads having edges thereof abutting and unsupported in the region of the aligned openings whereby to permit yielding or flexing of the pads in this region when a gauge rod is passed therebetween.

2. A gauge rod wiper comprising a pair of supporting members connected to one another for relative sliding movement, each of said supporting members having an opening adapted to be aligned with the opening in the other of said supporting members, a pair of absorbent pads disposed between and maintained in position by said supporting members when the openings are aligned, said absorbent pads having edges thereof abutting and unsupported in the region of the aligned openings whereby to permit yielding or flexing of the pads in this region when a gauge rod is passed therebetween, and a closure member movably mounted on one of said supporting members for closing the opening therein whereby to protect the abutting edges of the absorbent pads.

3. A gauge rod wiper comprising a supporting member adapted to be secured to an engine and having an opening therethrough, a housing member mounted on said supporting member for sliding movement relative thereto and having an opening therein adapted to be aligned with the opening in said supporting member, a pair of absorbent pads disposed in said housing member and having edges thereof abutting in the region of the opening therein, said pads being maintained within said housing member by said supporting member when the openings are aligned, a closure member movably mounted on said supporting member for closing the opening therein whereby to protect the absorbent pads, and stop means on said supporting member for limiting the movement of said housing member relative thereto whereby to properly align the said openings.

4. A gauge rod wiper comprising a supporting member adapted to be secured to an engine and having an opening therethrough, a housing member mounted on said supporting member for sliding movement relative thereto and having an opening therein adapted to be aligned with the opening in said supporting member, a pair of absorbent pads disposed in said housing member and having edges thereof abutting in the region of the opening therein, said pads being maintained within said housing member by said supporting member when the openings are aligned, a closure member movably mounted on said supporting member for closing the opening therein whereby to protect the absorbent pads, stop means on said supporting member for limiting the movement of said housing member relative thereto whereby to properly align the said openings, and a stop shoulder on said supporting member for limiting the movement of said closure member whereby to prevent removal thereof when the wiper is secured to the engine and to position said closure member so as to insure a proper covering of the absorbent pads.

5. A gauge rod wiper comprising a flat supporting member adapted to be secured to an engine and having an opening therethrough, said supporting member having the longitudinal edges thereof curled to provide opposed flanges forming trackways, a housing member having the edges thereof disposed in said trackways to permit sliding movement thereof on said supporting member, said housing member having an opening therein adapted to be aligned with the opening in said supporting member, a pair of absorbent pads disposed in said housing member and having edges thereof abutting in the region of the opening therein, said pads being maintained within said housing member by said supporting member when the openings are aligned, and a closure member having the edges thereof curled to overlie the flanges on said supporting member to permit sliding movement of the closure member relative thereto for closing the opening in said supporting member.

6. A gauge rod wiper comprising a flat supporting member adapted to be secured to an engine and having an opening therethrough, said supporting member having the longitudinal edges thereof curled to provide opposed flanges forming trackways, a housing member having the edges thereof disposed in said trackways to permit sliding movement thereof on said supporting member, said housing member having an opening therein adapted to be aligned with the opening in said supporting member, a pair of absorbent pads disposed in said housing member and having edges thereof abutting in the region of the opening therein, said pads being maintained within said housing member by said supporting member when the openings are aligned, a closure member having the edges thereof curled to overlie the flanges on said supporting member to permit sliding movement of the closure member relative thereto for closing the opening in said supporting member, and a shoulder at one edge of said supporting member for providing a stop to limit the movement of said closure member.

7. A gauge rod wiper comprising a flat supporting member adapted to be secured to an engine and having an opening therethrough, said supporting member having the longitudinal edges thereof curled to provide opposed flanges forming trackways, a housing member having the edges thereof disposed in said trackways to permit sliding movement thereof on said supporting member, said housing member having an opening therein adapted to be aligned with the opening in said supporting member, a pair of absorbent pads disposed in said housing member and having edges thereof abutting in the region of the opening therein, said pads being maintained within said housing member by said supporting member when the openings are aligned, a closure member having the edges thereof curled to overlie the flanges on said supporting member to permit sliding movement of the closure member relative thereto for closing the opening in said supporting member, said supporting member having a second opening therein, a plate backing said second opening and fixedly secured by the flanges thereon, said plate being adapted to maintain a card or the like extending across said second opening and serving as a stop means for limiting the movement of said housing member on said supporting member.

FREDERICK L. SHELOR.